(12) United States Patent
Wenzel et al.

(10) Patent No.: US 10,364,520 B2
(45) Date of Patent: Jul. 30, 2019

(54) APPARATUS FOR STITCHING VEHICLE INTERIOR COMPONENTS

(71) Applicant: Inteva Products, LLC, Troy, MI (US)

(72) Inventors: Edward J. Wenzel, Troy, MI (US); Joseph Anthony Massetti, Algonac, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 15/369,505

(22) Filed: Dec. 5, 2016

(65) Prior Publication Data
US 2017/0233915 A1    Aug. 17, 2017

Related U.S. Application Data

(63) Continuation of application No. 14/585,173, filed on Dec. 29, 2014, now Pat. No. 9,512,547, which is a
(Continued)

(51) Int. Cl.
*D05B 1/06*    (2006.01)
*D05B 15/00*   (2006.01)
(Continued)

(52) U.S. Cl.
CPC ............... *D05B 1/06* (2013.01); *B60K 37/04* (2013.01); *B60N 2/5883* (2013.01);
(Continued)

(58) Field of Classification Search
CPC .......... D05B 1/06; D05B 15/00; D05B 57/04; D05B 57/30; D05B 57/32; D05C 7/04;
(Continued)

(56) References Cited

U.S. PATENT DOCUMENTS 1,731,221 A    10/1929    Becker
1,820,935 A     9/1931    Buhler
(Continued)

FOREIGN PATENT DOCUMENTS

CN    37103297 A    11/1987
CN     1250496 A     4/2000
(Continued)

OTHER PUBLICATIONS

Chinese Office Action for Application No. 201280033806.X; dated Feb. 3, 2015; 9 pgs.
(Continued)

*Primary Examiner* — Ismael Izaguirre
(74) *Attorney, Agent, or Firm* — Cantor Colburn LLP

(57) ABSTRACT

An apparatus for stitching an interior component is disclosed herein. The component having an outer skin layer and the apparatus is a single needle chain stitch machine with a rotary looper and wherein a needle of the apparatus descends through the interior component and a hook of the rotary looper engages a thread loop formed during retraction of the needle after it has descended through the interior component; and wherein the apparatus further includes a mechanism for moving the interior component relative to the needle and looper to establish a stitch length.

12 Claims, 5 Drawing Sheets

Related U.S. Application Data continuation of application No. 13/543,489, filed on Jul. 6, 2012, now Pat. No. 8,919,270.

(60) Provisional application No. 61/505,836, filed on Jul. 8, 2011.

(51) Int. Cl.
| | | |
|---|---|---|
| *D05B 57/04* | (2006.01) | |
| *D05B 57/30* | (2006.01) | |
| *D05B 57/32* | (2006.01) | |
| *B60K 37/04* | (2006.01) | |
| *B60R 13/02* | (2006.01) | |
| *D05C 7/04* | (2006.01) | |
| *B60N 2/58* | (2006.01) | |

(52) U.S. Cl.
CPC .......... *B60N 2/5891* (2013.01); *B60R 13/02* (2013.01); *B60R 13/0256* (2013.01); *D05B 15/00* (2013.01); *D05B 57/04* (2013.01); *D05B 57/30* (2013.01); *D05B 57/32* (2013.01); *D05C 7/04* (2013.01)

(58) Field of Classification Search
CPC .... B60K 37/04; B60N 2/5883; B60N 2/5891; B60R 13/02; B60R 13/0256
See application file for complete search history.

(56) References Cited

U.S. PATENT DOCUMENTS

| | | | |
|---|---|---|---|
| 2,147,006 A | 2/1939 | Zablocki | |
| 2,168,568 A | 8/1939 | Gouldbourn et al. | |
| 2,328,705 A | 9/1943 | Becker | |
| 2,332,125 A | 10/1943 | Zonis et al. | |
| 2,386,660 A | 10/1945 | Clayton | |
| 2,529,575 A | 11/1950 | Sailer | |
| 2,673,537 A | 3/1954 | Eastman | |
| 2,760,457 A * | 8/1956 | Rabezzana | D05B 69/32 112/221 |
| 2,860,591 A | 11/1958 | Ness | |
| 3,055,323 A | 9/1962 | Miller et al. | |
| 3,602,168 A | 8/1971 | Yamashita | |
| 3,732,833 A | 5/1973 | Brookhyser et al. | |
| 3,866,554 A | 2/1975 | Holtzman | |
| 3,875,877 A | 4/1975 | Fox | |
| 4,169,422 A | 10/1979 | Hayes et al. | |
| 4,488,498 A | 12/1984 | Smith | |
| 4,561,367 A | 12/1985 | Corbett et al. | |
| 4,711,190 A | 12/1987 | Smith | |
| 4,848,252 A | 7/1989 | Ciucani | |
| 5,094,180 A | 3/1992 | Salganik | |
| 5,313,897 A | 5/1994 | Katamine et al. | |
| 5,390,950 A | 2/1995 | Barnes et al. | |
| 5,679,296 A | 10/1997 | Kelman et al. | |
| 5,799,599 A * | 9/1998 | Tsukioka | D05B 3/14 112/255 |
| 5,873,318 A | 2/1999 | Bohlinger et al. | |
| 5,874,030 A * | 2/1999 | Takeuchi | B29C 44/146 264/46.6 |
| 5,881,663 A * | 3/1999 | Tsukioka | D05B 3/14 112/156 |
| 5,988,085 A | 11/1999 | Martz | |
| 6,045,732 A | 4/2000 | Nakatsuji et al. | |
| 6,095,069 A | 8/2000 | Tadzhibaev | |
| 6,129,031 A | 10/2000 | Sarh et al. | |
| 6,178,903 B1 | 1/2001 | Bondanza et al. | |
| 6,196,145 B1 | 3/2001 | Burgess | |
| 6,263,815 B1 | 7/2001 | Furudate | |
| 6,401,643 B2 | 6/2002 | Iida | |
| 6,450,678 B1 | 9/2002 | Bayersdorfer | |
| 6,997,126 B2 | 2/2006 | Murley | |
| 7,278,363 B2 | 10/2007 | Wieczorek et al. | |
| 7,401,829 B2 | 7/2008 | Michalski et al. | |
| 7,431,484 B2 | 10/2008 | Fong | |
| 7,661,740 B2 | 2/2010 | Saito | |
| 8,215,810 B2 | 7/2012 | Welch, Sr. et al. | |
| 8,316,785 B2 | 11/2012 | Boinais et al. | |
| 8,833,829 B2 | 9/2014 | Wenzel et al. | |
| 8,919,270 B2 | 12/2014 | Wenzel et al. | |
| 9,010,259 B2 | 4/2015 | Schwarzberger | |
| 9,340,912 B2 | 5/2016 | Wenzel et al. | |
| 9,512,547 B2 * | 12/2016 | Wenzel | D05B 1/06 |
| 2003/0168151 A1 | 9/2003 | Wright et al. | |
| 2004/0206284 A1 | 10/2004 | Ochi et al. | |
| 2005/0260379 A1 * | 11/2005 | Verhaeghe | B29C 70/24 428/95 |
| 2006/0197321 A1 | 9/2006 | Saito et al. | |
| 2007/0101771 A1 | 5/2007 | Wildeman et al. | |
| 2007/0193673 A1 | 8/2007 | Aoyama et al. | |
| 2009/0090285 A1 * | 4/2009 | Dooley | B29C 45/14 112/470.27 |
| 2009/0316401 A1 | 12/2009 | Choquet et al. | |
| 2010/0296302 A1 | 11/2010 | Welch, Sr. et al. | |
| 2011/0030596 A1 | 2/2011 | Boinais et al. | |
| 2011/0063872 A1 | 3/2011 | Irie et al. | |
| 2011/0084852 A1 | 4/2011 | Szczerba et al. | |
| 2011/0171435 A1 | 7/2011 | Sheldon et al. | |
| 2012/0010588 A1 | 1/2012 | Morishita | |
| 2012/0297547 A1 | 11/2012 | Myers et al. | |
| 2012/0297643 A1 | 11/2012 | Shaffer et al. | |
| 2013/0008362 A1 | 1/2013 | Wenzel et al. | |
| 2013/0009416 A1 | 1/2013 | Wenzel et al. | |
| 2013/0014682 A1 | 1/2013 | Brindzik | |
| 2013/0147228 A1 | 6/2013 | Filipp | |
| 2014/0306476 A1 | 10/2014 | Wenzel et al. | |
| 2014/0339843 A1 | 11/2014 | Wenzel et al. | |
| 2015/0033996 A1 | 2/2015 | Wenzel et al. | |
| 2015/0040812 A1 | 2/2015 | Schwarzberger | |
| 2015/0158115 A1 | 6/2015 | Davies | |
| 2015/0176165 A1 | 6/2015 | Wenzel et al. | |
| 2016/0096490 A1 | 4/2016 | Wenzel et al. | |
| 2016/0122928 A1 | 5/2016 | Wenzel et al. | |
| 2016/0159293 A1 | 6/2016 | Wenzel et al. | |
| 2016/0160418 A1 | 6/2016 | Wenzel et al. | |

FOREIGN PATENT DOCUMENTS

| | | |
|---|---|---|
| CN | 1298974 A | 6/2001 |
| CN | 1325466 A | 12/2001 |
| CN | 1330737 A | 1/2002 |
| CN | 2587903 Y | 11/2003 |
| CN | 1746365 A | 3/2006 |
| CN | 1826443 A | 8/2006 |
| CN | 201010768 Y | 9/2006 |
| CN | 101024478 A | 8/2007 |
| CN | 201176507 Y | 1/2009 |
| CN | 202688649 U | 1/2013 |
| CN | 103649396 A | 3/2014 |
| CN | 103649397 A | 3/2014 |
| CN | 104053577 | 9/2014 |
| DE | 3703070 A1 | 9/1988 |
| JP | S4319332 Y1 | 4/1967 |
| JP | S58105784 A | 6/1983 |
| JP | 03097491 A | 4/1991 |
| JP | 6511395 A | 12/1994 |
| JP | 2001162068 A | 6/2001 |
| JP | 2002159772 A | 6/2002 |
| JP | 2003334895 A | 11/2003 |
| JP | 2005087510 A | 4/2005 |
| JP | 2006075221 A | 3/2006 |
| JP | 2006081636 A | 3/2006 |
| JP | 2006273312 A | 10/2006 |
| JP | 2013043571 A | 3/2013 |
| KR | 1020030024287 A | 3/2003 |
| KR | 1020060050815 A | 5/2006 |

(56) References Cited

FOREIGN PATENT DOCUMENTS

| WO | 2004078518 A1 | 9/2004 |
|---|---|---|
| WO | 2013090371 A1 | 6/2013 |

OTHER PUBLICATIONS

CN Office Action for Application No. 20120034003.6 dated Dec. 2, 2014; 7 pgs.
CN Office Action for Application No. 201280034003.6 dated Jul. 24, 2015; 5 pgs.
CN Office Action for application No. 2012800330806.X dated Feb. 3, 2015; 9 pgs.
English Abstact for JP2006081636A—Mar. 30, 2006; 2 pgs.
English Abstract JP03097491.
English Abstract JP2001162068A—Jun. 19, 2001.
English Abstract for CN1298974—Jun. 13, 2001; 1 pg.
English Abstract for CN1325466A—Dec. 5, 2001; 2 pgs.
English abstract for CN1746365A—Mar. 15, 2006; 2 pgs.
English Abstract for CN1826443A—Aug. 30, 2006; 1 pg.
English Abstract for CN201176507Y—Jan. 7, 2009; 1 pg.
English Abstract for DE3703070A1—Sep. 1, 1988; 1 pg.
English Abstract for JP2005087510A—Apr. 7, 2005; 1 pg.
English Abstract for JP2006075221A—Mar. 23, 2006; 1 pg.
English Abstract for JP2006273312A—Oct. 12, 2006; 2 pgs.
English Abstract for JP2013043571A—Mar. 4, 2013; 1 pg.
English Abstract for JP6511395A—Dec. 22, 1994; 1 pg.
English Abstract for KR20030024287A—Mar. 26, 2003; 1 pg.
English Translation for CN Office Action Application No. 201280033806.X dated Feb. 3, 2015; 11 pgs.
English Translation for CN Office Action for Application No. 201280034003.6 dated Jul. 24, 2015; 5 pgs.
English Translation for Japanese Office Action Patent Application No. 2014-519078; dated May 31, 2016; 5 pgs.
English Translation of Chinese Office Action for Application No. 201280033806.X; dated Feb. 3, 2015; 11 pgs.
English Translation of CN Office Action for Application No. 201280034003.6 dated Dec. 2, 2014; 8 pgs.
English Translation of Japanese Office Action for Patent Application No. 2014-519079; dated Apr. 26, 2016; 4 pgs.
English Translation of Third Chinese Office Action for Application No. 201280033806.X; dated Feb. 22, 2016; 1 pg. (No References Cited in Office Action).
Englisth Abstract KR102006000815A—May 19, 2006; 2 pgs.
International Search Report dated Jan. 25, 2013 for International application No. PCT/US2012/045798.
International Search Report dated Jan. 25, 2013 for International application No. PCT/US2012/045797; International filing date: Jul. 6, 2012; 5 pgs.
International Search Report for International application No. PCT/US2015/043438; International Filing Date: Aug. 3, 2015, dated Nov. 19, 2015; 3 pgs.
International Search Report for International Application No. PCT/US2015/043436; International Filing Date: Aug. 3, 2015; dated Nov. 12, 2015; 3 pgs.
International Written Opinion for International Application No. PCT/US2015/043436; International Filing Date: Aug. 3, 2015; dated Nov. 12, 2015; 4 pgs.
International Written Opinion for International application No. PCT/US2015/043438; International Filing Date: Aug. 3, 2015; dated Nov. 19, 2015; 5 pgs.
Japanese Office Action for Application No. 2014-519078; dated May 31, 2016; 5 pgs.
Japanese Office Action for Patent Application No. 2014-519079; dated Apr. 26, 2016; 5 pgs.
Office Action, dated Feb. 3, 2015 for application No. 201280033806.X; 9 pgs.
PCT Written Opinion for International Application No. PCT/US2015/056907; International Filing Date: Oct. 22, 2015; dated Feb. 4, 2016; 3 pgs.
Third Chinese Office Action for Application No. 201280033806.X; dated Feb. 22, 2016; 3 pgs.
Written Opinion dated Jan. 25, 2013 for International application No. PCT/US2012/045797; International filing date: Jan. 25, 2013; 5 pgs.
Written Opinion dated Jan. 25, 2013 for International application No. PCT/US2012/045798.
PCT ISR for International Application No. PCT/US2015/056907; International Filing Date: Oct. 22, 2015; dated Feb. 4, 2016; 3 pgs.
Chinese Office Action Patent Application No. 201580052884.8; dated Sep. 30, 2018.
Engish Translation for JP Office Action dated Apr. 4, 2017 for Application No. 2014-519078.
English Translation for Japanese Office Action Patent Application No. 2014-519079; dated Mar. 21, 2017.
English Translation JP Office Action Application No. 2017-152063; dated Jun. 5, 2018.
English Translation JP Office Action dated Aug. 14, 2018 for Application No. 2014-519078.
English Translation to Japanese Office Action Patent Application No. 2014-519078; dated Mar. 24, 2017.
EP Office Action dated May 29, 2018 for Application No. 15830089.7.
European Search Report for Applcation No. EP 15830089 dated Feb. 2017.
Japanese Office Action Patent Application No. 2014-519078; dated Mar. 24, 2017.
Japanese Office Action Patent Application No. 2014-519079; dated Mar. 21, 2017.
Japanese Office Action Patent Application No. 2014-519079; dated Oct. 3, 2017.
JP Office Action Application No. 2017-152063; dated Jun. 5, 2018.
JP Office Action dated Apr. 4, 2017 for Appication No. 2014-519078.
JP Office Action dated Aug. 14, 2018 for Application No. 2014-519078.
Search Report for Patent Application No. 201580052884.8; dated Sep. 30, 2018.
Supplemental European Search Report for Application No. EP 15 83 0089 dated Jul. 2017.
Supplemental European Search Report for Application No. EP 15 83 0603 dated Feb. 2018.
Supplemental European Search Report for Application No. EP 15 85 3135 dated Mar. 2018.
Written Opinion for Application No. EP 15 83 0089 dated Feb. 2017.
Written Opinion for Application No. EP 15 83 0603 dated Feb. 2017.
Written Opinion for Application No. EP 15 85 3135 dated Mar. 2017.
English Translation to CN Office Action dated Dec. 29, 2018 for Application No. 201580052211.2.
EP Office Action dated Dec. 12, 2018 for Application No. 15 830 603.5.
CN Office Action dated Dec. 29, 2018 for Application No. 201580052211.2.
EP Office Action dated Jan. 23, 2019 for Application No. 15 830 089.7.
EP Office Action dated Jan. 23, 2019 for Application No. 15 853 135.0.
Search Report dated Dec. 23, 2018 for Application No. 201580052211.2.
English Translation for JP Office Action Application No. 2017152063 dated Feb. 12, 2019; 4 pgs.
JP Office Action for Application No. 2017152063 dated Feb. 12, 2019; 4 pgs.
CN Office Action for Application No. 201580057119.5; dated Feb. 3, 2019.
English Translation to CN Office Action for Application No. 201580057119.5; dated Feb. 3, 2019.
Search Report for Chinese Application No. 2015800571195 ;dated Jan. 28, 2019.

(56) References Cited

OTHER PUBLICATIONS

English Machine Translation to Abstract of CN202688649.
English Machine Translation to Abstract of CN2587903.

\* cited by examiner

CHAIN STITCH SEWING HEAD WITH
UNDERCUT-ACCESSIBLE ROTARY LOOPER

SINGLE NEEDLE SINGLE THREAD CHAIN STITCH
CROSS SECTIONAL VIEW

CHAIN STITCH SEWING HEAD WITH
UNDERCUT-ACCESSIBLE OFFSET LOOPER HOOK

APPARATUS FOR STITCHING VEHICLE INTERIOR COMPONENTS

CROSS REFERENCE TO RELATED APPLICATIONS

This application is a continuation of U.S. patent application Ser. No. 14/585,173 filed on Dec. 29, 2014, which is a continuation of U.S. patent application Ser. No. 13/543,489 filed on Jul. 6, 2012, now U.S. Pat. No. 8,919,270, which claims the benefit of U.S. Provisional Application Ser. No. 61/505,836, filed on Jul. 8, 2011, the contents each of which are incorporated herein in their entirety by reference thereto.

BACKGROUND

This invention relates to an interior structure for a vehicle interior. More particularly, the invention relates to an apparatus for stitching vehicle interior components.

Currently, most stitching found in an automotive interior is of the functional variety, wherein two or more pieces of material (leather, vinyl, TPO, cloth, etc) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications; however, the ability to offer a simulated stitch in a contrasting color is not production feasible at this time. Additionally, more OEMs are requested that a real or "live" stitch be used on decorate components to provide the look and feel of a true cut-n-sew component.

Accordingly, it is desirable to provide a live, non-functional stitch on decorative automotive trim components.

SUMMARY OF THE INVENTION

An apparatus for stitching an interior component, having an outer skin layer, wherein the apparatus is a single needle chain stitch machine with a rotary looper and wherein a needle of the apparatus descends through the interior component and a hook of the rotary looper engages a thread loop formed during retraction of the needle after it has descended through the interior component; and wherein the apparatus further comprises a mechanism for moving the interior component relative to the needle and looper to establish a stitch length.

In yet another embodiment, a method for stitching an interior component is provided. The method including the steps of: stitching an outer skin layer of the interior component with a single needle chain stitch machine having a rotary looper; descending a needle of the machine through the interior component; retracting the needle after is has descended through the interior component; engaging a thread loop formed during the retraction of the needle after it has descended through the interior component with a hook of the rotary looper, wherein a portion of interior component is located above and below the rotary looper as it rotates; and moving the interior component relative to the needle and rotary looper in order to establish a stitch length.

BRIEF DESCRIPTION OF THE DRAWINGS

Other features, advantages and details appear, by way of example only, in the following description of embodiments, the description referring to the drawings in which.

DETAILED DESCRIPTION

Figure 1:
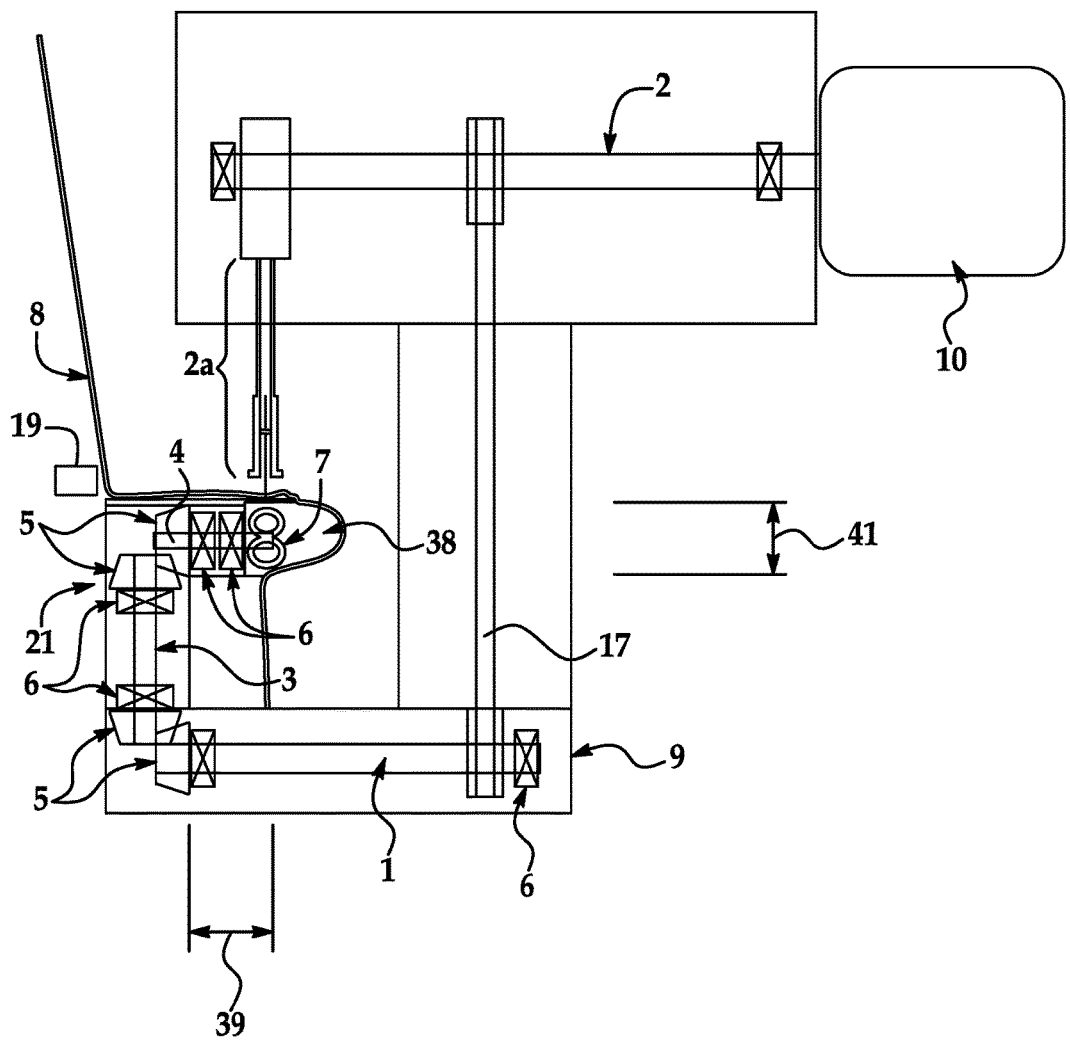
FIG. 1 is a schematic illustration of an apparatus for stitching a component of a vehicle.
Figure 2:
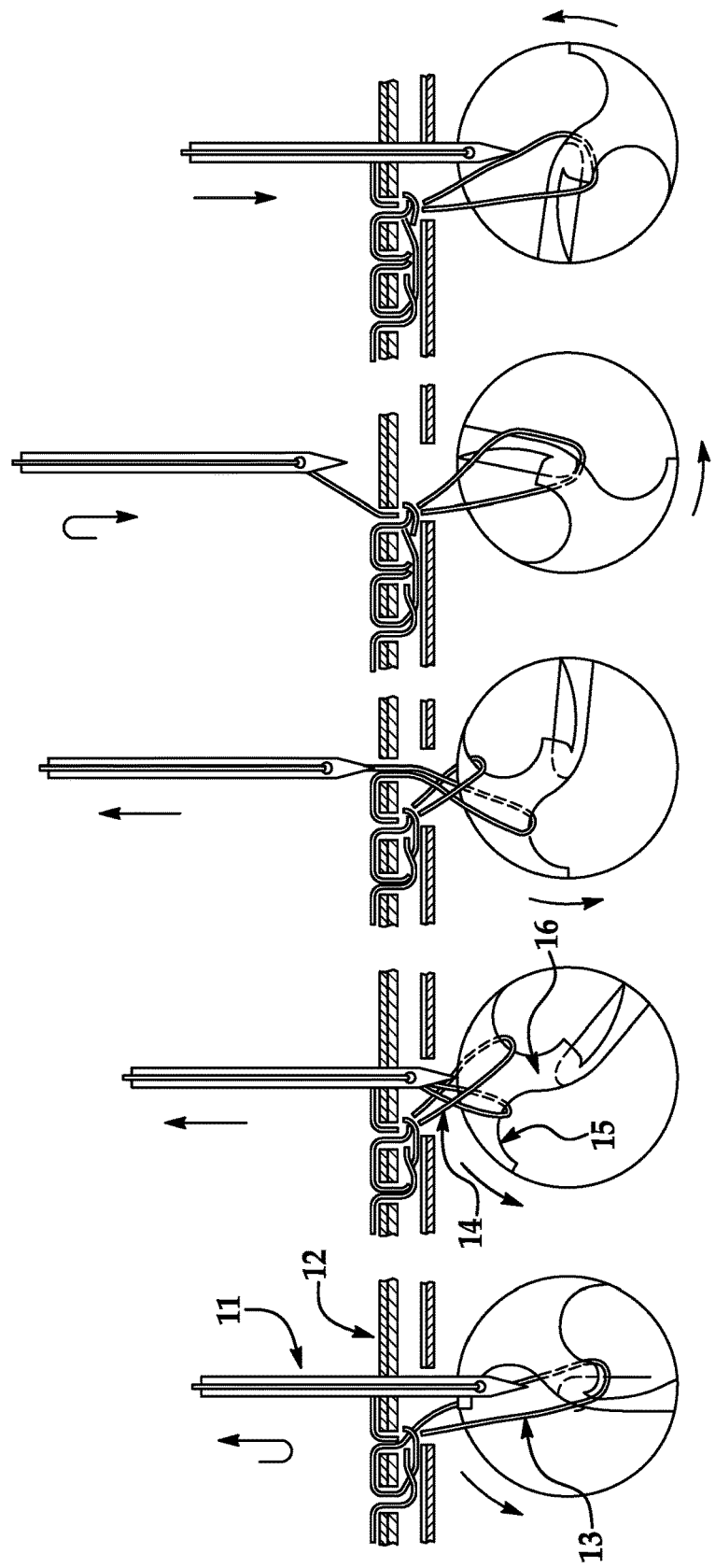
FIGS. 2A-2E sequentially illustrates a stitching sequence of an exemplary apparatus of the present invention.

Turning now to the drawings, wherein to the extent possible like reference numerals are utilized to designate like components throughout the various views, an interior portion of a vehicle is illustrated. In one implementation interior portion is a portion of an instrument panel of a vehicle. Also illustrated, is an apparatus for stitching the interior portion.

The interior portion may be a single layer or multi-layered construction. In one embodiment, the interior portion includes at least an outer skin layer having a substantially smooth outer surface and an underside facing away from the outer surface. The outer skin layer is preferably formed of a plastic material of substantial flexibility and aesthetically pleasing character. In one embodiment, the interior portion is a decorative element of a vehicle interior.

In order to enhance the softness of interior portion and in one embodiment, a layer of cushioning support material may be provided in the region below the outer skin layer. It is contemplated that the cushioning support material may be of any number of different constructions although a foamed material such as cross linked polypropylene (XLPP) foam may be potentially preferred. A substrate panel of dimensionally stable plastic or other suitable material can also be disposed below the cushioning support material.

According to one potentially preferred embodiment, the cushioning support material and the substrate panel serve cooperatively to provide a support structure for the outer skin layer.

It is contemplated that XLPP foam forming the cushioning support material may be blown between the outer skin layer and the substrate panel so as to form a multi-layered composite structure. It is also contemplated that the cushioning material may be attached to the outer skin layer in a preliminary cladding operation so as to form a preliminary layered composite which may thereafter be applied across any substrate panel as may be utilized.

Still further, the interior piece or decorative element may be anyone of a single layer (skin only), a double layer (skin/foam) or a triple layer (skin/foam/substrate). Accordingly, the apparatus disclosed herein in contemplated as being used with anyone of the aforementioned interior piece configurations.

As discussed above, there is a desire to provide a live, non-functional stitch on decorative automotive trim components without using costly cut-n-sew technologies. Typically, live non-functional stitching can be applied in one of the following ways:

I. Stitch a pattern on an unformed single or multilayer construction of trim material and wrap the sewn trim sheet around a preformed/precut substrate;

II. Stitch a pattern on a preformed single or multilayer construction of trim material and bond the sewn trim preform to a preformed molded substrate; and III. Stitch a pattern on a flat or relatively flat single or multilayer trim & substrate component construction.

As the part complexity increases, in addition to the desire of many OEMs to place the live, nonfunctional stitching along the edge and other tight confines of the component, the ability to access these areas with conventional sewing equipment becomes increasingly difficult. Special long arm, high post stationary sewing machines with custom post extensions have been designed and are being used with some success to stitch in these confined areas. However, as part size increases, it becomes increasingly difficult for the sewing machine operator to manipulate the part/preform under the sewing head without either damaging the part or producing an irregular stitch length or misaligned stitch.

As a result, movement of the sewing machine around a fixed part becomes a more plausible solution as the part and stitch complexity increases. Movement is commonly guided by a 6 axis robot in order to provide access to all areas of the part. In addition to provide the ability to sew a large 3D component without damaging the part, the robot minimizes concerns regarding irregular stitch length and stitch misalignment.

Several types of sewing heads have been developed for attachment to a robot. Both post bed type and cylinder type robotic stitching heads have been developed for sewing 3D components. Both chain and lock type stitch patterns have also been utilized. Cylinder type machines designed to date have either been chain stitch with a hook looper in the cylinder arm or a lock stitch with a bobbin oriented with its axis of rotation in a horizontal fashion. Post bed type machines have also consisted of a chain stitch hook looper located at the top of the post or a lock stitch with a bobbin oriented vertically or horizontally at the top of the post.

The instant application is directed to an improvement in the existing robotic sewing head design technology to enable increased access to confined stitch areas.

Exemplary embodiments of the invention described herein, consists of a robotic sewing/stitching head design that enhances the ability to stitch in confined areas of a three-dimensionally shaped part. The design utilizes a chain type stitch with the use of a rotary looper at the end of a combination post and cylinder bed (see at least FIG. 1).

In FIG. 1, a lower shaft 1 is also driven by the same servo motor 10 (via mechanical linkage 17) that drives an upper shaft 2 and needle bar assembly 2a. Shaft 1 is configured to drive a series of secondary lower shafts (3 and 4) through appropriate gearings 5 and bearing supports 6.

A rotary looper 7 is attached to the output of the last shaft 4 which in turn rotates to hook and secure the top thread to the underside of a component 8 being sewn. The position and dimensions of the lower arm assembly 9 is such that all areas of the component 8 being sewn can be accessed. It is desirable to size the diameter of the rotary looper and associated lower arm enclosure to maximize access to the backside of the part while providing the ability to accommodate the desired thread size and stitch length. For example, the configuration of the rotary looper 7 allows an underside area 38 of component 8 to be accessed. This would not be feasible with a vertically driven mechanism located directly below the rotary looper 7. An extension 39 of the appropriately configured diameter 41 of the rotary looper is shown in FIG. 1.

The means of driving the rotary looper is not limited to the description above and can be reconfigured accordingly to achieve the same effect, namely access into confined area such as area 38.

Figure 4:
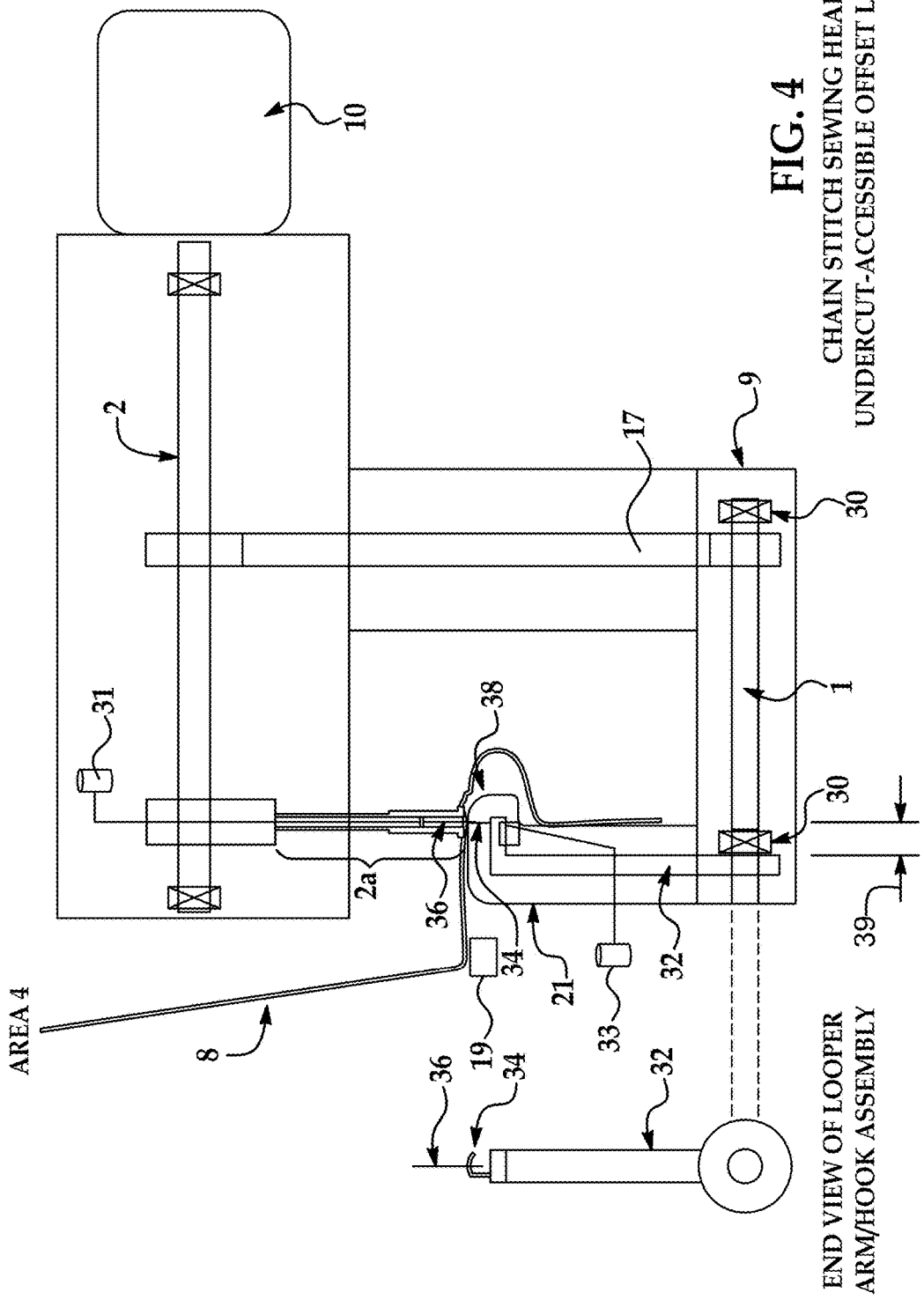
FIG. 4 is a schematic illustration of an apparatus for stitching a component of a vehicle according to an alternative exemplary embodiment.
Figure 5:
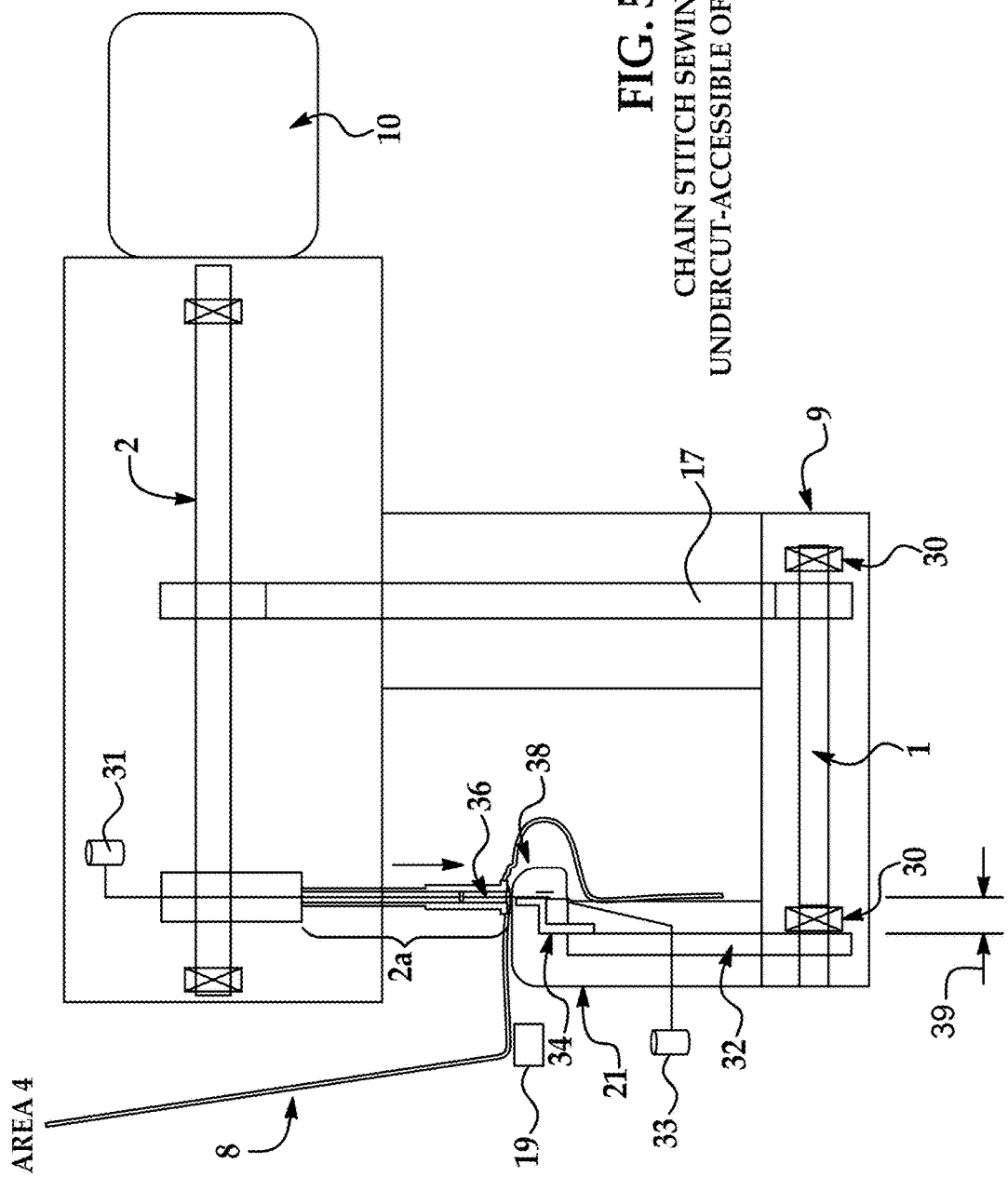
FIG. 5 is a schematic illustration of an apparatus for stitching a component of a vehicle according to yet another alternative exemplary embodiment.

A typical operation sequence for a single needle chain stitch machine with a rotary looper and single thread is described below and is the preferred, but not only, method of stitching to accomplish a compact stitching head construction. As shown in FIGS. 2A-2E, the stitching sequence begins with the needle 11 descending through a material 12 and passing through the thread loop 13 generated during the previous cycle. A new thread loop 14 is generated via the friction between the thread and material as the needle 11 retracts through the material. The hook 15 of the rotary looper 16 engages the new thread loop during needle retraction. After the needle exits the material, the material moves relative to the needle and looper to establish the stitch length via a mechanism that is configured to move the material. The aforementioned mechanism is illustrated schematically via box 19 in FIGS. 1, 4 and 5. Box 19 may represent a mechanism for moving the part or component 8 relative to the sewing head 21 or alternatively a robot (as mentioned above) coupled to the sewing head 21 and configured to move the sewing head 21 relative to a stationary part or component 8. Still further and in yet another embodiment, a pair of mechanisms 19 (e.g., one robot and one for moving the part) may operate in concert with each other to simultaneously move the part 8 and the sewing head 21 or alternatively the two mechanisms 19 may alternate in their operation (e.g., part movement then sewing head movement). The material of component 8 movement can be accomplished via a feed dog mechanism and walking foot integral to a stationary sewing head 21 or the sewing head 21 can be moved relate to a fixed material position by for example a robot. During the advancement of the material relative to the sewing head 21 via the mechanism 19 the rotary looper releases the previous thread loop from the looper and the thread is drawn tightly against the bottom of the material. The looper hook continues to rotate and position itself to engage the next loop once again as the needle creates a new piercing and moves through the bottom of its stroke. This sequence continued until the stitching pattern is completed.

Figure 3:
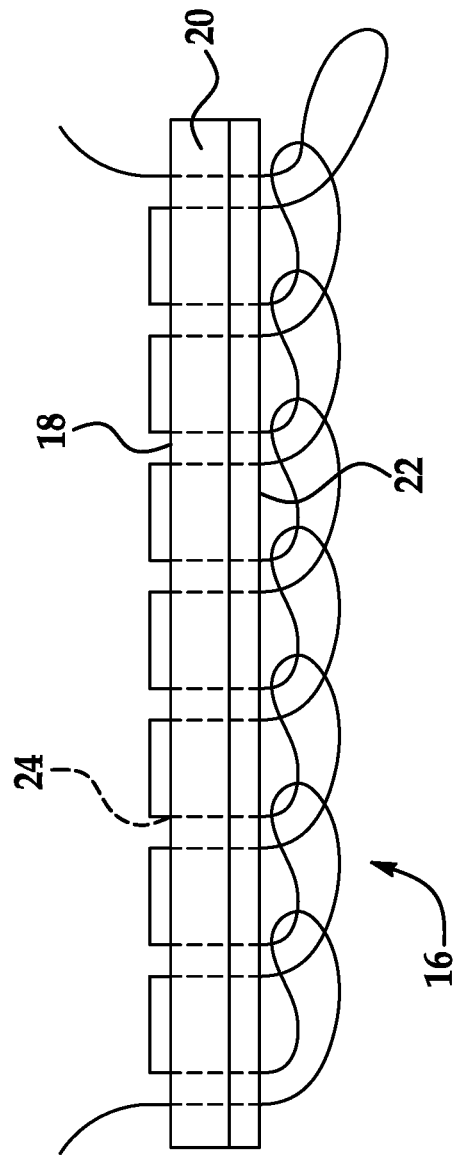
FIG. 3 is cross sectional view of a component stitched in accordance with an exemplary embodiment of the present invention.

The completed stitch pattern 23 appears as shown in FIG. 3. Preformed materials used with this stitching head design are typically, but not limited to, thermoplastic vacuum formed or slush cast formed sheet or vacuum formed thermoplastic sheet of multilayer construction consisting of, at minimum, a skin 25 and foam layer 27 but also may include a barrier layer behind the foam as well as a rigid thermoplastic polymer that serves as the substrate 29 for the three dimensionally formed part.

An alternative exemplary design utilizes a chain type stitch with the use of an offset looper arm (see FIG. 4) or an offset looper hook (see FIG. 5) at the end of a combination post and cylinder bed in lieu of a rotary looper hook. The use of a looper arm/hook configuration enables the use of both a top thread 31 and a bottom thread 33 (illustrated schematically) to further enhance the security of the stitch against the sewn part.

In the case of the offset looper arm (FIG. 4), the lower shaft 1 is supported by bearings 30 and the lower shaft 1 is also driven by the same servo motor 10 that drives the upper shaft 2 and needle bar assembly 2a via mechanical linkage 17. The lower shaft is also configured to direct drive an offset looper arm 32 such that the desired rotational movement of the arm 32 and hook 34 is achieved. The offset of the looper arm 32 is illustrated as length 39 and the looper arm houses/contains a looper hook 34 that engages the loops formed by the needle 36 in a fashion similar to that described in FIG. 2. The position and dimensions of the lower arm assembly 9 is such that all areas of the component 12 being sewn can be accessed. It is desirable to design the depth of the offset 39 on the looper arm 32 and associated lower arm enclosure to maximize access to the backside of the part 12 while providing the ability to accommodate the desired thread size and stitch length.

In the case of the offset looper hook 34 (FIG. 5), the same machine configuration exists as with the offset looper arm 32 with the exception that the hook 34 instead of the arm 32 contains the offset 39 required to gain access to the restricted areas of the part.

Accordingly, an underside of the part 12 in area 38 can be access via the offset 39.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An apparatus for stitching an interior component, the interior component comprising an outer skin layer, and wherein the apparatus is a single needle chain stitch machine with a rotary looper during operation of the apparatus a needle of the apparatus descends through the interior component and a hook of the rotary looper engages a thread loop formed during retraction of the needle after it has descended through the interior component; and wherein the rotary looper is rotatably driven by a horizontal shaft that is operably coupled to and extends from a vertical shaft such that the rotary looper is offset from vertical shaft and the apparatus further comprises a mechanism for moving the interior component relative to the needle and the looper to establish a stitch length, wherein a robot is coupled to a sewing head having the needle, the robot moving the sewing head with respect to the interior component.

2. The apparatus as in claim 1, wherein the rotary looper releases a previous thread loop as the interior component is moved by the mechanism and wherein the thread loop is drawn tightly against a bottom of the interior component.

3. The apparatus as in claim 1, wherein the vertical shaft is driven by a lower shaft operably coupled to a motor.

4. The apparatus as in claim 3, wherein the lower shaft is coupled to the vertical shaft via gearings and the vertical shaft is coupled to the horizontal shaft via gearings.

5. The apparatus as in claim 4, wherein the lower shaft is coupled to an upper shaft via mechanical linkage and the upper shaft is driven by the motor.

6. The apparatus as in claim 5, wherein the upper shaft drives a needle bar assembly that houses the needle.

7. The apparatus as in claim 6, wherein a robot is coupled to a sewing head having the needle and the needle bar assembly, the robot moving the sewing head with respect to the interior component.

8. An apparatus for stitching an interior component, the interior component having an outer skin layer, and the apparatus is a single needle chain stitch machine with a rotary looper wherein a needle of the apparatus descends through the interior component and a hook of the rotary looper engages a thread loop formed during retraction of the needle after it has descended through the interior component, wherein the rotary looper has an arm member configured with an offset such that the hook is offset axially from other portions of the arm member, the arm member being directly driven by a lower shaft coupled to a motor, the motor also driving an upper shaft that drives the needle; and wherein the apparatus further comprises a mechanism for moving the interior component relative to the needle and the looper to establish a stitch length.

9. The apparatus as in claim 8, wherein a robot is coupled to a sewing head having the needle, the robot moving the sewing head with respect to the interior component.

10. The apparatus as in claim 9, wherein the rotary looper is driven by a lower shaft operably coupled to a motor.

11. The apparatus as in claim 1, wherein the lower shaft is coupled to an upper shaft via mechanical linkage and the upper shaft is driven by the motor.

12. The apparatus as in claim 11, wherein the upper shaft drives a needle bar assembly that houses the needle.

* * * * *